Feb. 23, 1965  A. C. NOWLIN  3,170,637
METHOD AND APPARATUS FOR TREATING SEWAGE
Filed June 12, 1963  2 Sheets-Sheet 1
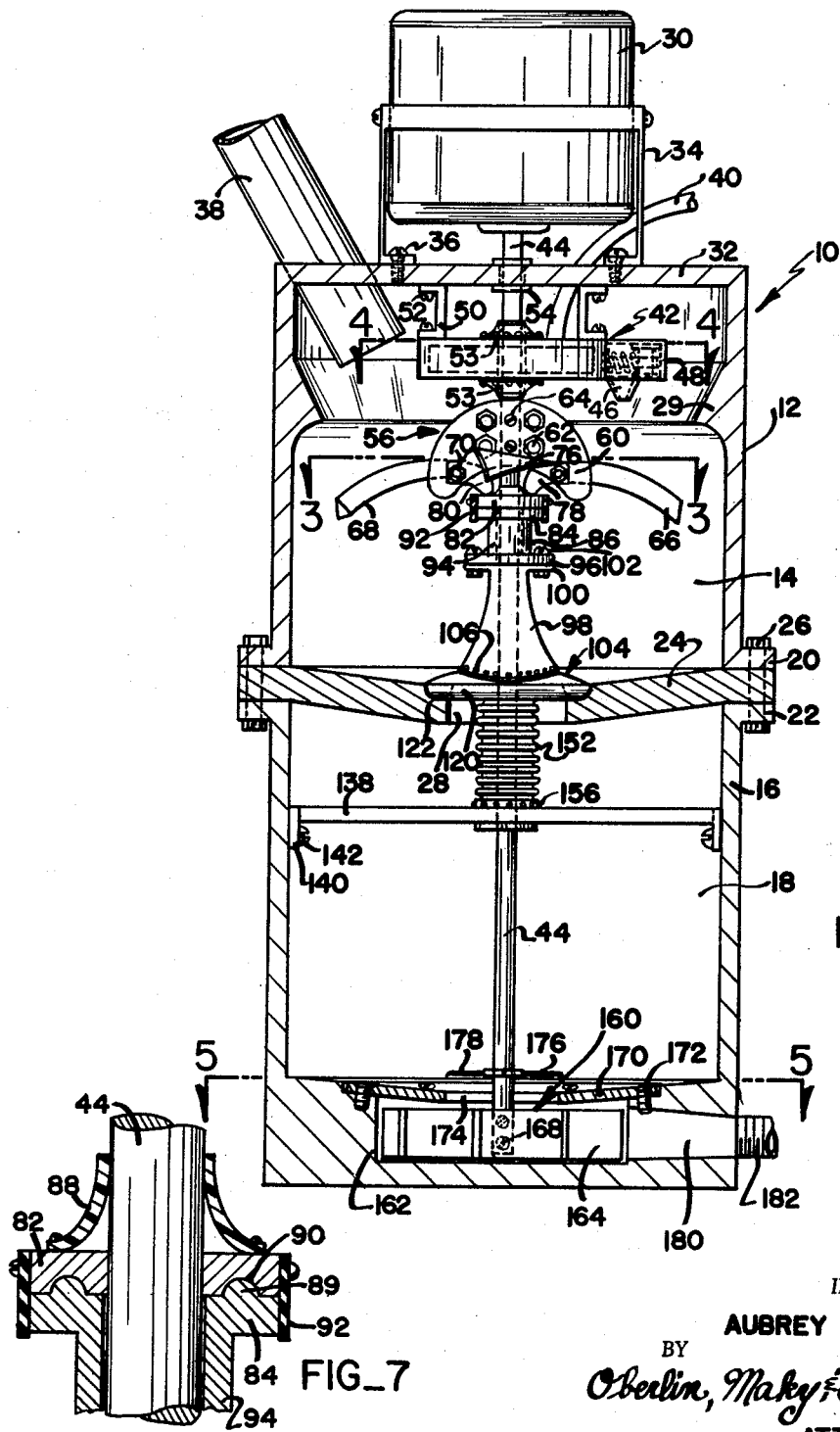
FIG_1
FIG_7
INVENTOR.
AUBREY C. NOWLIN
BY
Oberlin, Maky & Donnelly
ATTORNEYS

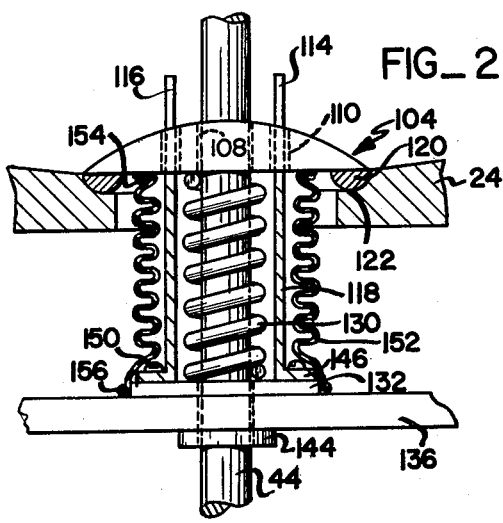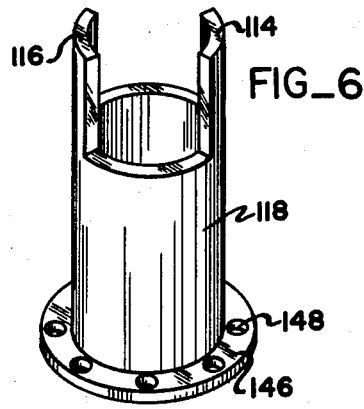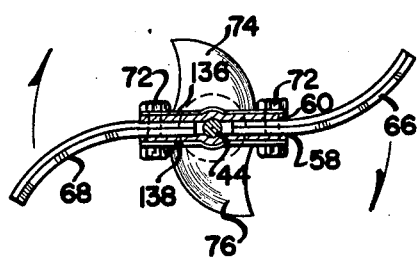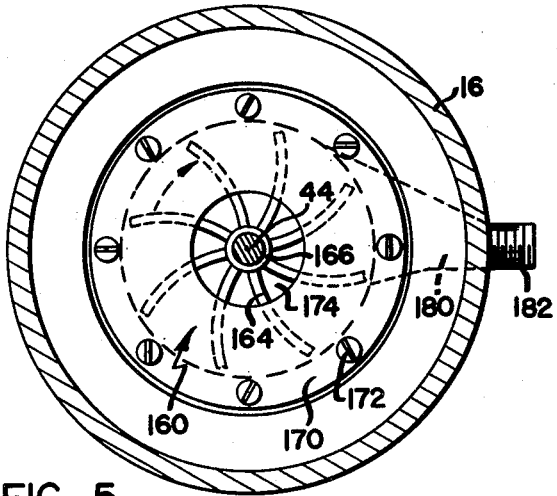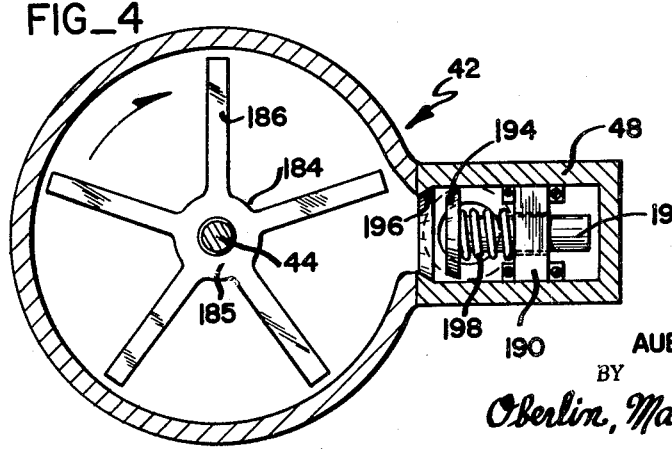

United States Patent Office 3,170,637
Patented Feb. 23, 1965

3,170,637
METHOD AND APPARATUS FOR TREATING SEWAGE
Aubrey C. Nowlin, 2607 S. Florence Drive, Tulsa, Okla.
Filed June 12, 1963, Ser. No. 287,294
16 Claims. (Cl. 241—15)

This invention relates as indicated to a sewage treatment unit and more particularly to a sewage treatment unit suitable for use on boats, trains, or similar transportation media.

Sewage discharge units have been used in the indicated environment for discharging sewage from vessels or trains while the same are in motion, the sewage generally being discharged to a point beneath the vessel or train. Means for comminuting the sewage prior to discharge have also been employed, as exemplified by my issued patent entitled "Sewage Grinding Device," U.S. Letters Patent No. 3,049,306, dated August 14, 1962.

With the passage of stricter anti-pollution statutes, it has become necessary to satisfactorily treat the sewage prior to discharge and the present invention relates to a novel device for comminuting and fully treating the sewage delivered thereto prior to discharge therefrom. The term "comminuting" as used herein is employed in a generic sense and is meant to include processes commonly referred to as "grinding," "macerating," "chopping," etc.

With the above in mind, it is a primary object of the present invention to provide a separated, two-compartment unit for comminuting and fully treating the sewage delivered thereto before the same is discharged therefrom.

A more specific object of the invention is to provide a sewage treatment unit wherein the sewage is comminuted in the presence of treating fluid in an upper chamber and then delivered to a separate lower chamber for retention therein for varying periods of time to effect further treatment of said sewage by said fluid prior to discharge of the fully treated sewage from the lower chamber. The fully treated sewage is at all times separated from the untreated or partly treated sewage.

Yet another object is to provide such a sewage treatment unit wherein the treating fluid is automatically delivered in predetermined amounts to the upper chamber of the unit only during operative conditions of the comminuting means therein.

Still another object of the invention is simultaneously to comminute and treat in the upper chamber of the unit the sewage delivered thereto while the previously further treated sewage is discharged from the lower chamber. A further, related object is to provide a common power source operatively connected to which in vertically spaced relation are the comminuting means, the treating fluid delivery means, and the discharge means in the lower chamber for discharging fully treated sewage therefrom.

Another object is to provide a sewage treatment unit that will shred any paper that may be delivered thereto and which will prevent such shredded paper before discharge thereof from adversely affecting operation of the unit.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a vertical cross-sectional view of one embodiment of the sewage treating unit of the invention;

FIG. 2 is an enlarged, partially sectioned view of the valve mechanism for selectively controlling communication between the upper and lower chamber of the unit;

FIG. 3 is a sectional view of the comminuting assembly, taken on lines 3—3 of FIG. 1;

FIG. 4 is a sectional view taken on lines 4—4 of FIG. 1;

FIG. 5 is a sectional view of the pump disposed in the lower chamber of the unit, taken on lines 5—5 of FIG. 1;

FIG. 6 is an enlarged perspective view of an element forming part of the valve mechanism shown in FIG. 2; and FIG. 7 is an enlarged, sectional view through the thrust bearing assembly.

Referring now to the drawings, wherein like reference characters are used to designate like parts, the sewage treatment unit embodying the invention is generally indicated at 10 and comprises an upper housing 12 defining an upper comminuting chamber 14 and a lower housing 16 defining a lower residence chamber 18. The housing members 12 and 16 are provided with opposed annular flanges 20 and 22, respectively, which have disposed therebetween a partition member 24, the flanges 20 and 22 and the partition 24 being securely assembled by means of circumferentially spaced mounting bolts 26 which extend through aligned openings in these members. The partition 24 thus forms a common wall between the upper and lower chambers 14 and 18, respectively, and in order to establish controlled communication therebetween the partition is provided with a centrally located opening 28 having a valve member cooperable therewith for closing the same, as will be described hereinbelow. As can be seen in FIG. 1, the partition 24 slopes downwardly toward opening 28 to facilitate gravity discharge of the comminuted and treated sewage from the upper chamber through such opening. An annular, inwardly directed shoulder or ledge 29 is formed in the upper housing 12 for deflecting sewage directed thereagainst downwardly, as will be further described hereinbelow.

Power means 30 preferably in the form of a conventional electric motor is mounted on the top wall 32 of the upper housing 12 by means of motor support brackets 34 which are secured to top wall 32 by means of bolts 36.

A sewage inlet 38 communicates with the upper chamber 14, preferably through an opening in the top wall 32 of the upper housing 12, for delivering sewage to the upper chamber. A sewage treating material, preferably a fluid disinfectant, communicates with the upper chamber 14 through inlet line 40 which extends through the top wall 32, the lower end of inlet line 40 communicating with the inlet (not shown) of a centrifugal pump generally indicated at 42 for pumping the sewage treating fluid into the upper chamber 14. The fluid line 40 may, if desired, be provided with a suitable metering orifice (not shown) for delivering predetermined amounts of treating fluid to the pump 42. Although any suitable disinfecting material can be employed, satisfactory results have been obtained through the use of chlorine solution (e.g. sodium hypochlorite). The impeller of the pump 42 is mounted on the motor drive shaft 44 and rotates therewith for pumping the chlorine solution into the chamber 14. The solution is discharged from pump 42 through a valve controlled pump outlet and subsequently through a passage 46 in a housing member 48 mounted on the pump 42, the structure of which will be further described hereinbelow when particular reference is made to FIG. 4.

The pump 42 is mounted on the top wall 32 of the upper housing 12 by means of brackets 50 and mounting bolts 52 which extend through horizontal bracket flanges into the top wall 32. Cone shaped preferably rubber seals 53 are mounted, e.g. by bradding, to the top and bottom of the pump 42 housing, the reduced diameter ends of the seals relatively firmly contacting the shaft 44 to prevent entry of foreign matter into the pump 42.

The drive shaft 44 extends through the top wall 32 in a bearing sleeve 54 and has further mounted thereon a comminuting assembly generally indicated at 56. Referring to FIGS. 1 and 3, the comminuting assembly 56 comprises a pair of relatively flat plate members 58 and 60 which are formed with generally semicylindrical central portions for clamping the plates 58 and 60 around the drive shaft 44 by any suitable means, for example clamping bolts 62. Mounting pins 64 are provided for rigidly mounting the plates to the drive shaft. A pair of oppositely disposed curved blades 66 and 68 are pivotally mounted between plates 58 and 60 by means of pivot pins 70 which extend through aligned openings in the plates and blades and are secured in position by means of nut members 72. The blades 66 and 68 are preferably triangular in cross section and are pivotally mounted so as normally to hang downwardly in a generally vertical direction. In the form shown the blades 66 and 68 are longitudinally curved with the convex faces thereof being in the direction of rotation of the blades in order to prevent paper from clinging thereto. Additional curved blades 74 and 76 are mounted on the outer sides of the plates 58 and 60 around the pins 70, being also retained by the nuts 72. The blades 74 and 76 are provided with sharpened leading edges and function to further comminute and shred the sewage and paper, respectively, as well as directing downwardly the material impinging against the downwardly curved faces thereof.

The blades 66 and 68 are formed with inner, hooked end portions 78 and 80, respectively, which are adapted to contact a thrust bearing 82 when the comminuting assembly is rotated. As will be apparent, the blades 66 and 68, because of the manner in which they are mounted, will swing radially outwardly during rotation due to centrifugal force whereby the inner, hooked ends 78 and 80 will contact the thrust bearing 82.

Referring to FIG. 7, the thrust bearing 82 is frictionally driven by the drive shaft for rotation therewith and axial movement relative thereto and has closely spaced thereto an upper flange member 84 which forms part of a bearing member 86 through which the drive shaft 44 extends for rotation relative thereto. A plastic seal 88 is secured to the thrust bearing 82 preferably by bradding and the upper portion of such plastic seal tightly receives the shaft 44 whereby rotation of the latter effects rotation of the thrust bearing 82. Although the shaft rotatably couples the bearing 82 through the seal 88, the contact therebetween is such to enable the seal, and the thrust bearing to which it is secured, to vertically move on said shaft. The seal 88 in addition functions of course to prevent entry of liquid, paper, etc. around the shaft 44 inside the seal.

To prevent radial disalignment between the thrust bearing 82 and the flange 84, the latter is provided with an upwardly directed, annular bead 89 which is received in a complementary groove 90 formed in the thrust bearing 82.

To prevent the entry of fluid, paper, etc. through the interface of the bearing 82 and the flange 84 to the shaft 44 a rubber or plastic sealing band 92 is mounted on the bearing 82 by any suitable means, e.g. screws, and extends downwardly over such interface.

The bearing member 86 further includes an intermediate cylindrical portion 94 loosely mounted around shaft 44, and a lower flange portion 96. The latter has mounted on the bottom thereof a cone shaped, longitudinally inflexible seal member 98 which is provided with an upper annular flange 100 through which bolts 102 extend for such mounting. The seal 98 functions to prevent entry of paper, etc. to the area directly above the valve member generally indicated at 104, to which the bottom of the seal 98 is attached, preferably by bradding 106.

Referring to FIG. 2, in which figure the seal 98 has been omitted for sake of clarity, the valve 104 is centrally bored at 108 freely to receive the drive shaft 44, and to prevent rotation of the valve the same is provided with a pair of elongated openings 110 and 112 which are adapted to receive upwardly extending arms 114 and 116, respectively, which form an integral part of fixed cylinder 118, FIG. 6.

The valve 104 is provided with an annular, half round rubber or plastic ridge 120 which is adapted to seat on a mating valve seat 122 formed in the partition 24 for closing the partition opening and shutting off communication between the upper chamber 14 and the lower chamber 18.

It should now be apparent that the valve member 104 is vertically downwardly movable responsive to the radial outward movement of the blades 66 and 68 through the engagement of the hooked ends 78 and 80 thereof with the thrust bearing 82, such downward movement being transmitted through the non-rotatable but axially movable bearing member 86 and the longitudinally inflexible seal member 98. Actuation of the motor 30 and the corresponding rotation of the drive shaft 44 will by centrifugal force cause the blades 66 and 68 to move to such radially extending position as shown in FIG. 1, thereby effecting a seating of the valve 104 on the valve seat 122. Thus, during periods of comminution of the sewage delivered to the upper chamber through the sewage inlet 38, the valve 104 will be seated, thereby confining the sewage and the fluid delivered to the chamber through the fluid inlet line 40 and pump 42 in the upper chamber 14 until termination of the comminuting operation, as controlled by motor 30.

For normally biasing the valve member 104 upwardly to an unseated position, a coil spring 130 is mounted around the drive shaft 44, the upper convolution of such spring contacting the lower surface of the valve 104. The coil spring 130 will be compressed to its FIG. 2 position when the valve member 104 is moved vertically downwardly responsive to the rotation of the blades 66 and 68 as above described. When the motor 30 is shut off, the coil spring 130 will force the valve member 104 vertically upwardly thereby unseating the valve 104 and permitting drainage of the comminuted and treated sewage from the upper chamber 14 to the lower chamber 18.

The lower convolution of coil spring 130 rests on stationary lower bearing member 132 which is mounted on the hub of a fixed supporting member 136. The latter includes a plurality of circumferentially spaced spider arms 138, FIG. 1, the outer ends of which are in the form of downwardly projecting flanges 140, mounting screws 142 extending through said flanges into the lower housing 16. A lower bearing member 144 is provided below the supporting member 136 to additionally rotatably support the shaft 44 in the lower chamber 16.

The cylinder 118, FIG. 6, is provided with a horizontal annular bottom flange 146 having circumferentially spaced openings 148 through which mounting bolts 150 extend (FIG. 2) for securing the cylinder to the fixed bearing member 132.

A flexible, preferably rubber, bellows 152 is disposed around the cylinder 118 between the valve 104 and the bearing 132 for preventing foreign matter, e.g. paper, etc. from entering the area above the valve 104. The bellows 152 is secured to the underside of the valve 104 by means of screws 154 and to the periphery of the bearing member 132 by means of screws 156. It will be apparent that as the coil spring 130 forces an unseating of the valve 104 subsequent to a shutting off of the motor 30, the bellows 152 will expand as the valve moves upwardly.

Referring to FIGS. 1 and 5, a centrifugal pump generally indicated at 160 is mounted in a recess 162 in the bottom wall of the lower housing 16, the pump comprising an impeller having a plurality of curved vanes 164 and a central hub 166 which fits over the bottom of the shaft 44. The impeller can be mounted for rotation with the shaft by any suitable means, a pair of mounting screws 168 being illustrated for such purpose, whereby the pump 160 is operative during actuation of the motor 30. A pump housing plate 170 is mounted above the impeller to the bottom wall of the unit by means of bolts 172, the plate being formed with a central opening 174 which defines an inlet for the pump. Disposed immediately above the opening 174 and secured to the shaft 44 for rotation therewith are auxiliary cutting blades 176 and 178 through the plane of which material must pass before entering the impeller inlet opening 174. Thus any paper which may have passed into the lower chamber 18 contacts and is shredded by the blades 176 and 178 before final discharge from the unit.

The impeller discharges the material fed thereto through a discharge outlet 180 formed in the bottom wall of the unit and through a discharge pipe 182 extending outwardly of the unit for discharge of the fully treated sewage. The discharge pipe 182 preferably has associated therewith a check valve (not shown) for preventing entry of foreign matter into the unit through the discharge pipe and to permit regulating the discharge of a unit volume of comminuted and treated sewage from residence chamber 18 to a time period when comminuted sewage is not being delivered from chamber 14 to such residence chamber. Such check valve may be similar to valve 192, 194, for example, described below, and of course, opens when the impeller pump 160 is driven to provide the requisite pressure.

Referring to FIG. 4, the pump 42, generally described above, comprises a plastic impeller 184 having a hub 185, which is preferably molded to the shaft 44, and vanes 186 which extend radially therefrom in the usual manner. The hub 185 preferably extends above and below the pump housing, terminating within the confines of the seals 53. The valve housing 48 has mounted on the inside of the top wall thereof a valve guide or bearing member 190 which is bored to receive a valve stem 192 for reciprocation therethrough. A valve head 194 is adapted to seat on a complementary valve seat 196 at the discharge end of the pump 42, such valve head 194 being normally biased to a seated position by means of coil spring 198 which is disposed around stem 192 between the valve head 194 and the bearing or guide member 190. When drive shaft 44 is rotated, the centrifugal force of the fluid in the pump 42 develops sufficient pressure to force the valve head 194 to an unseated position as shown in FIG. 4 against the bias of the coil spring 198. The chlorine solution then flows in an annular stream around the valve head 194 and outwardly of the valve housing 48 through the passage 46. The cessation of rotation of the shaft 44 and hence the pump impeller will cause the pump pressure to drop whereupon the coil spring 198 will bias the valve head 194 to a seated position. In this manner fluid will be at all times retained in the pump housing thereby making the pump self-priming for the next comminuting operation.

The operation of the sewage treatment unit above described is as follows: Prior to the introduction of sewage to the upper chamber through the sewage inlet 38, the motor 30 is turned on whereby the blades 66 and 68 will move to a radially extended operative position. Simultaneously therewith the valve 104 will be moved to a seated position as above described, and the pumps 42 and 160 will be actuated. The pump 42 will thereby deliver treating fluid into the upper chamber 14 and the pump 160 will discharge from chamber 18 the fully treated sewage present therein. The incoming sewage is then directed to the upper chamber 14 through the sewage inlet 38, the sewage falling by gravity into the path of rotating blades 66, 68, 74 and 76 for comminution thereby. As the sewage is comminuted, any portion thereof directed upwardly will contact the annular shoulder 29 which will redirect the sewage into the path of the rotating blades for further comminution. After a predetermined period, which may if desired be automatically time-controlled, the motor 30 is shut off thereby rendering the pumps 42 and 160 inoperative and causing dropping of the blades 66 and 68 to a radially inward, substantially vertical position. As the blades 66 and 68 move to such position, the coil spring 130 will force the valve 104 to an unseated position whereupon the completely comminuted and partially treated sewage mixture drains from the upper chamber 14 through the opening 28 to the lower chamber 18. Until the next such operation is initiated, the sewage will be further treated by the chlorine solution in the lower chamber 18 whereby the sewage will normally be completely treated by the chlorine solution prior to the initiation of the next sewage treatment operation and the discharge of the fully treated sewage from the lower chamber 18 through the discharge pipe 182.

It will accordingly be seen that applicant has provided a novel apparatus for, and method of, treating sewage in a two-stage operation, the first stage being the comminuting of the sewage in an upper chamber in the presence of a treating fluid such as chlorine solution, and the second stage being the further treating of the comminuted sewage in the presence of the chlorine solution in a lower, separate chamber.

Other modes of applying the principle of the invention may be employed, change being made as regards the details described, provided the features stated in any of the following claims or the equivalent of such be employed.

I therefore particularly point out and distinctly claim as my invention:

1. A sewage treatment unit comprising an upper sewage comminuting chamber and a lower chamber for receiving sewage from said upper chamber, a sewage inlet to said upper chamber, material inlet means communicating with said upper chamber for delivering sewage treating material thereto, a sewage outlet disposed adjacent the bottom of said lower chamber, sewage comminuting means mounted in said upper chamber, power means for operating said comminuting means, pump means for discharging comminuted and treated sewage from said lower chamber, and valve means for selectively placing said upper chamber and said lower chamber into and out of communication with each other, said valve means being operatively connected to said comminuting means whereby operation of the latter by said power means positions said valve to shut off communication between said upper and lower chambers, and cessation of operation of said comminuting means serves to reestablish such communication.

2. A sewage treatment unit comprising an upper chamber and a lower, treated sewage receiving chamber, a partition disposed between and forming a common wall between said chambers, said partition being provided with a centrally located opening for receiving valve means effective when seated to shut off communication between said upper chamber and said lower chamber, means for biasing said valve to an unseated position whereby said upper chamber communicates with said lower chamber through said partition opening, a sewage inlet to said upper chamber, a fluid inlet to said upper chamber for delivering sewage treating fluid to said upper chamber, discharge means for discharging treated sewage from said bottom chamber, comminuting means rotatably mounted in said upper chamber, and power means for rotating said comminuting means, said comminuting means being operatively connected to said valve to effect a seating thereof in said partition opening against the action of said biasing means responsive to rotation of said comminuting means, whereby sewage delivered to said upper chamber is confined therein during rotation of said comminuting means and said biasing means acts to unseat said valve upon cessation of rotation of said comminuting means, whereby the comminuted treated sewage is delivered from said upper chamber through said partition opening to said lower chamber for ultimate discharge therefrom.

3. The combination of claim 2 further including pump means for delivering such sewage treating fluid to said upper chamber during rotation of said comminuting means.

4. The combination of claim 3 wherein said discharge means comprises a pump mounted adjacent the bottom of said lower chamber, said pump being driven by said power means to effect discharge of said treated sewage from said lower chamber simultaneously with the comminution of sewage in said upper chamber.

5. The combination of claim 4 wherein said sewage treating fluid pump, said comminuting means, and said sewage discharge pump are simultaneously driven by said power means from a common shaft.

6. The combination of claim 2 wherein said comminuting means includes a pair of oppositely disposed blades pivotally mounted on generally horizontal axes between a pair of blade mounting plates mounted on an output shaft of said power means and rotatable therewith, said blades being moved by centrifugal force developed by rotation of said shaft to a comminuting position generally perpendicular to said shaft.

7. The combination of claim 6 wherein said blades are longitudinally curved and include inner curved end portions which effect vertical movement of said valve through such movement of said blades.

8. A sewage treatment unit comprising an upper and a lower chamber, valve means controlling passage of sewage from said upper chamber to said lower chamber, a sewage inlet to said upper chamber, a sewage outlet from said lower chamber, a central vertical drive shaft extending in both said upper and lower chambers, power means for driving said shaft, sewage comminuting means driven by said shaft within said upper chamber, and a pump driven by said shaft to discharge treated sewage through said outlet from said lower chamber.

9. The unit of claim 8, wherein said power means is an electric motor, and including control means responsive to operation of said motor to close said valve means when said motor is operating and to open said valve means when said motor is not operating.

10. The unit of claim 8, including means driven by said power means to deliver sewage treating fluid to said upper chamber.

11. The unit of claim 8, wherein said power means is an electric motor mounted above said upper chamber, said comminuting means is mounted on said shaft within said upper chamber, a pump driven by said shaft is provided to deliver sewage treating fluid to said upper chamber, and control means are provided responsive to rotation of said shaft to close said valve means when said shaft is driven by said motor and to open said valve means when rotation of said shaft ceases.

12. The combination of claim 8, wherein said pump for discharging sewage from said lower chamber is of the centrifugal, self-priming type, the top inlet portion of which is substantially level with the bottom of said lower chamber.

13. The combination of claim 12, further including cutting means mounted on said shaft disposed above said pump inlet for further comminuting material introduced into said pump inlet.

14. A sewage treatment unit suitable for boats and the like comprising a comminuting chamber and a residence chamber, sewage inlet means to said comminuting chamber, means for delivering treating fluid to said comminuting chamber, comminuting means in said comminuting chamber, means operable to deliver comminuted sewage from said comminuting chamber to said residence chamber, means operable to discharge comminuted and treated sewage from said residence chamber, and batch control means operative to regulate such discharge of a unit volume of such comminuted and treated sewage from said residence chamber to a time period when comminuted sewage is not being delivered to said residence chamber.

15. A method of batch treating sewage comprising delivering sewage and a sewage treating material to a comminuting chamber, comminuting said sewage within said chamber in the presence of said treating material, thereafter delivering said comminuted, partially treated sewage together with said treating material to a second chamber for further treatment of the comminuted sewage by such material, and subsequently discharging said fully treated sewage from said second chamber simultaneously with the delivering of further sewage treating material to said comminuting chamber for comminuting such further sewage therein.

16. A method of batch treating sewage comprising delivering sewage and a sewage disinfecting fluid to a comminuting chamber, comminuting said sewage within said comminuting chamber in the presence of said disinfecting material while simultaneously discharging comminuted and disinfected sewage from a second chamber separate from and selectively communicable with said comminuting chamber, with the second chamber during such discharging being shut off from said comminuting chamber, thereafter delivering the comminuted and partially disinfected sewage and said fluid from said comminuting chamber to said second chamber for further treatment therein of said sewage by said fluid, and subsequently discharging said comminuted and disinfected sewage from said second chamber.

References Cited by the Examiner
UNITED STATES PATENTS

| | | | |
|---|---|---|---|
| 2,951,251 | 9/60 | Belden. | |
| 3,049,306 | 8/62 | Nowlin | 241—46 |
| 3,051,315 | 8/62 | Boester | 210—15 XR |

J. SPENCER OVERHOLSER, *Primary Examiner.*